Jan. 20, 1925.
O. B. OLSON
1,523,833
PRECIOUS METAL TRAP
Filed May 21, 1923          2 Sheets-Sheet 1
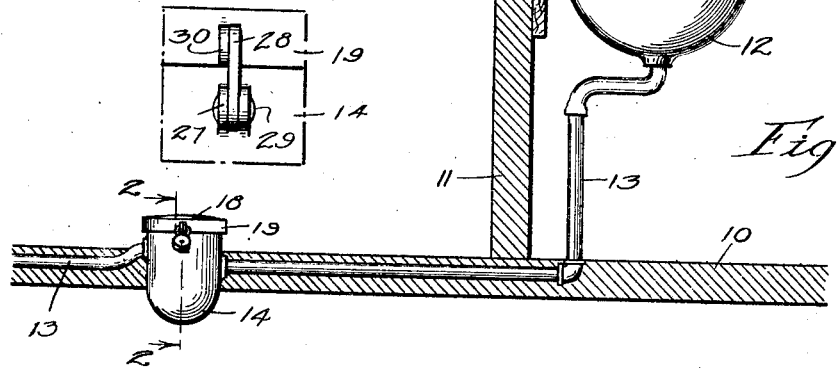
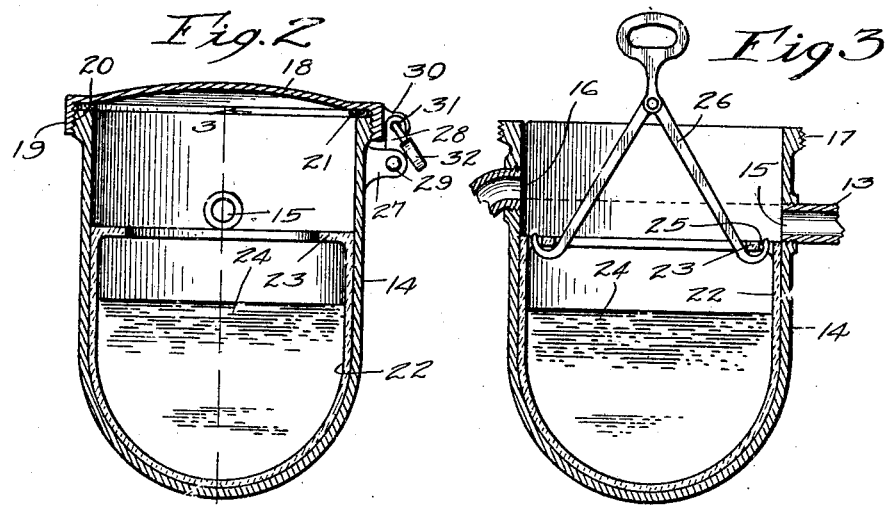
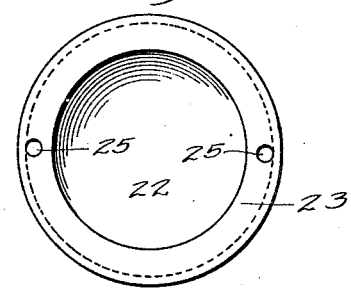
Witness
Lynn Latta
Inventor
Orville B. Olson
By Bair & Freeman
Attys Jan. 20, 1925.
O. B. OLSON
1,523,833
PRECIOUS METAL TRAP
Filed May 21, 1923  2 Sheets-Sheet 2
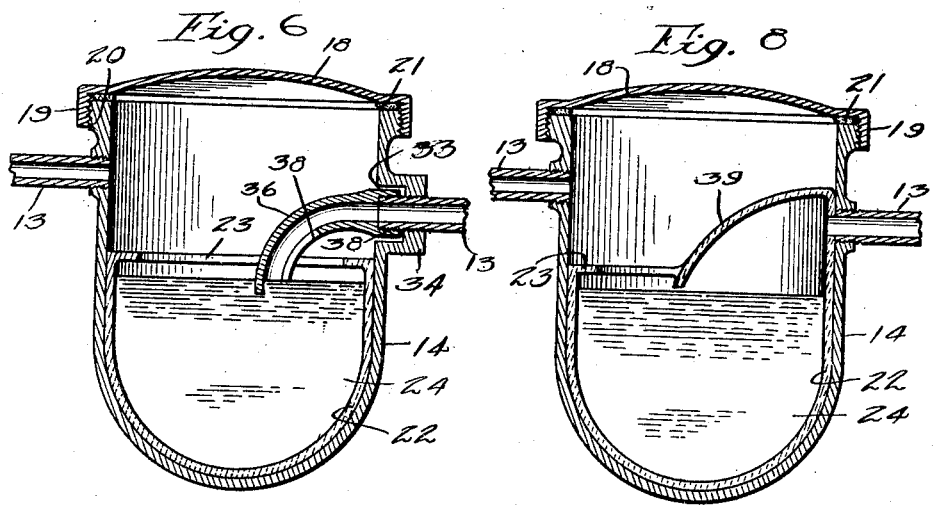
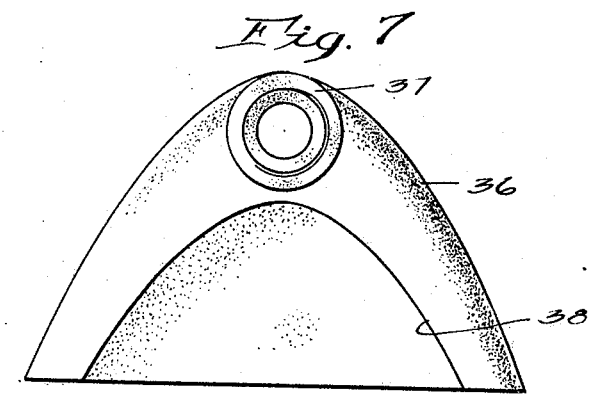
Witness
Lynn Latta
Inventor
Orville B. Olson
By Bair & Freeman
Att'ys Patented Jan. 20, 1925.

1,523,833

UNITED STATES PATENT OFFICE.

ORVILLE B. OLSON, OF WEBSTER CITY, IOWA.

PRECIOUS-METAL TRAP.

Application filed May 21, 1923. Serial No. 640,415.

*To all whom it may concern:*

Be it known that I, ORVILLE B. OLSON, a citizen of the United States, residing at Webster City, in the county of Hamilton and State of Iowa, have invented a certain new and useful Precious-Metal Trap, of which the following is a specification.

The object of my invention is to provide a precious metal trap adapted to be interposed in a waste water line, the parts being of simple, durable and comparatively inexpensive construction, whereby the trap can be manufactured and marketed at a comparatively low cost.

More particularly, my invention relates to a structure arranged to be interposed in a waste water line of shop or laboratory, where precious metals are used so that the precious metal dust or small pieces may be accumulated at a point and saved.

Still a further object is to provide a removable basin arranged in the trap which is non-metallic for receiving a quantity of mercury wherein the precious metals will become united with the mercury so that they can be later refined.

Still a further object is to provide means whereby the basin containing the mercury may be engaged for withdrawing it from the trap or bowl member.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a sectional view through a floor and wall, showing a waste water line with my improved trap shown therein.

Figure 2 is a central, sectional view through the trap taken on line 2—2 of Figure 1.

Figure 3 is a sectional view taken on line 3—3 of Figure 2.

Figure 4 is a side elevation of a portion of the device showing the coacting locking elements; and Figure 5 is a top plan view of the basin, which contains the mercury.

Figure 6 is a vertical, sectional view through a modified form of my device.

Figure 7 is a rear view of a deflector shield used in connection with the modified form shown in Figure 6.

Figure 8 is a similar sectional view through a further modified form of my device.

In the accompanying drawings, I have used the reference numeral 10 to indicate generally, a floor and 11 a wall. An ordinary lavatory 12 is secured to the wall 11 and has a waste water pipe line 13 secured thereto.

My trap includes a bowl member 14 arranged to be interposed in the pipe line 13. The bowl 14 is provided with an inlet passage way 15 and an outlet passage way 16. The inlet passage way is arranged so that it is lower than the outlet passage way, as clearly shown in Figure 3 of the drawings.

The upper edge of the bowl member 14 is exteriorly screw threaded, as at 17.

A cover member 18, having a downturned flange 19 thereon, is provided with a screw threaded portion 20 for coacting with the screw threaded portion 17.

An ordinary gasket 21 is interposed between the cover member 18 and the upper edge of the bowl 14. Received within the bowl member 14 is a basin 22 which is non-metallic. The basin 22 conforms to the outline of the bowl 14 so as to be snugly received therein. The basin 22 is preferably formed of glass or some other such material.

An inturned flange 23 is formed on the upper edge of the basin 22. The upper edge of the basin 22 is positioned just below the inlet passage way 15.

The basin 22 is designed to be filled with a mercury solution 24 so that any precious metals, which are discharged into the bowl member 14 through the passage way 15, will drop and mix with the mercury where it will be retained, while the water passing through the bowl member 14, will be discharged through the outlet passage way 16.

The inturned flange 23 on the basin 22, is provided with a pair of openings 24 for engagement with a pair of tongs 26, wherein the basin 22 may be withdrawn from the bowl member 14.

The precious metals will become mixed with the mercury 24, thus being salvaged so that they can later be refined.

The bowl member 14 is provided with a pair of spaced ears 27 which receive a locking element 28 therebetween. The locking element 28 is pivotally connected by means of a pivot 29 to the ears 27.

A locking ear 30 is formed on the flange 19 of the cover member 18 for engagement with the locking element 28. The locking ear 30 and the locking element 28 are provided with a pair of registered openings 31, for receiving a padlock 32.

In Figures 6 and 8 I have shown modified forms of my device wherein a means is provided for forcing the liquid passing through the trap downwardly into contact with the mercury.

In the form shown in Figure 6, a recessed chamber 33 is formed by the outwardly extending cup shaped portion 34 of the bowl member 14. A screw threaded opening is provided in the member 34 in which the intake pipe 13 is screwed. The pipe is adapted to extend to a point where its end is approximately flush with the inner surface of the bowl.

The recessed opening 33 is of considerably larger diameter than the pipe 13 in order to leave an annular space around the projecting portion of the pipe.

I have provided a deflector shield 36 which has the internally screw threaded collar 37. The shield is curved forwardly and downwardly from the collar 37 and extends outwardly and downwardly on each side so as to provide a downwardly flaring portion. The rear wall of the shield is cut away, as at 38.

The collar 37 is adapted to be threaded onto the end of the pipe 13 and the shield to extend downwardly into the mercury in the bowl.

The forward wall of the shield serves to deflect the incoming liquid downwardly so as to contact with the mercury, and the opening 38 allows the liquid to escape. The shield may be removed by unthreading it from the pipe 13 for allowing the removal of the basin 22.

By the use of the member 36, the current of liquid flowing through the bowl will be forced against the mercury so as to eliminate all of the precious metal therein.

In Figure 8, I have shown a deflector member 39 forming part of the basin 22.

It will be seen that I have provided a very efficient trap for collecting precious metals. My trap is especially designed to be placed in establishments where precious metals are handled so that when workmen wash, the precious metal dust will be collected in the basin 22.

It will be seen that I have provided a very efficient means for collecting of the precious metals which might otherwise be wasted.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A precious metal trap adapted to be interposed in a waste water pipe line, comprising a bowl member having inlet and outlet passage ways therein, a removable cover member for said bowl and a non-metallic basin mounted in said bowl below either the inlet or outlet passage ways, an inlet pipe in said inlet passage way, a removable deflector member mounted on the end of said pipe for causing the incoming fluid to pass downwardly before passing out through the outlet passage way.

2. A precious metal trap adapted to be interposed in a waste water pipe line, comprising a bowl member having inlet and outlet passage ways therein, a removable cover member for said bowl and a non-metallic basin mounted in said bowl below either the inlet or outlet passage ways, said bowl being filled with liquid heavier than water, an inlet pipe in said inlet passage way, a removable deflector member mounted on the end of said pipe and having its end extended into the liquid within the basin for causing the incoming fluid to pass downwardly through the liquid in the basin before passing out through the outlet passage way.

Des Moines, Iowa, April 16, 1923.

ORVILLE B. OLSON.